(12) United States Patent  (10) Patent No.: US 8,057,011 B2
Smith  (45) Date of Patent: Nov. 15, 2011

(54) FLUID DISPENSING DEVICE

(75) Inventor: Gilbert G. Smith, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 395 days.

(21) Appl. No.: 12/472,367

(22) Filed: May 26, 2009

(65) Prior Publication Data

US 2010/0302313 A1 Dec. 2, 2010

(51) Int. Cl.
*B41J 2/15* (2006.01)
*B41J 2/145* (2006.01)

(52) U.S. Cl. ............................ 347/40; 347/108; 347/109

(58) Field of Classification Search .................. 347/40, 347/42, 43, 47, 54, 56, 84–87, 108–109
See application file for complete search history.

(56) References Cited

U.S. PATENT DOCUMENTS

| 4,568,954 | A | | 2/1986 | Rosback |
| 4,575,738 | A | | 3/1986 | Sheufelt et al. |
| 4,586,058 | A | | 4/1986 | Yamazaki et al. |
| 4,928,126 | A | | 5/1990 | Asai |
| 5,293,913 | A | | 3/1994 | Preszler |
| 5,675,367 | A | | 10/1997 | Scheffelin et al. |
| 5,767,873 | A | * | 6/1998 | Rogers et al. ............ 347/40 |
| 5,815,182 | A | | 9/1998 | Otis et al. |
| 6,145,967 | A | | 11/2000 | Langford et al. |
| 6,155,670 | A | * | 12/2000 | Weber et al. ............ 347/43 |
| 6,722,752 | B2 | | 4/2004 | Davis et al. |
| 2008/0204527 | A1 | | 8/2008 | Yuen |

\* cited by examiner

*Primary Examiner* — Thinh Nguyen

(57) ABSTRACT

A fluid dispensing device and method to wick fluid, to be ejected or expelled by a fluid ejecting device, along a capillary slot.

20 Claims, 4 Drawing Sheets

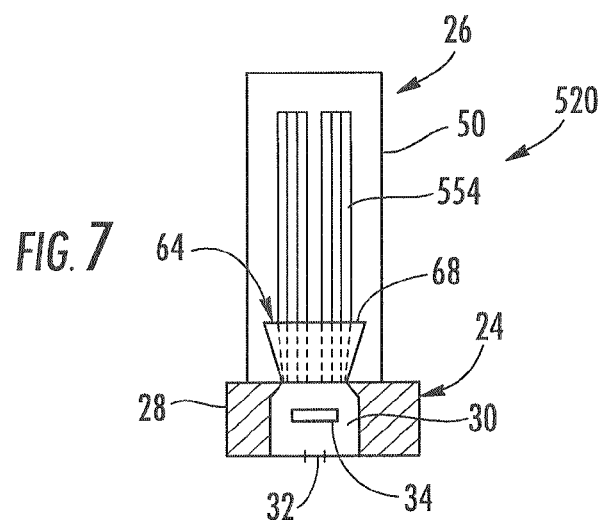
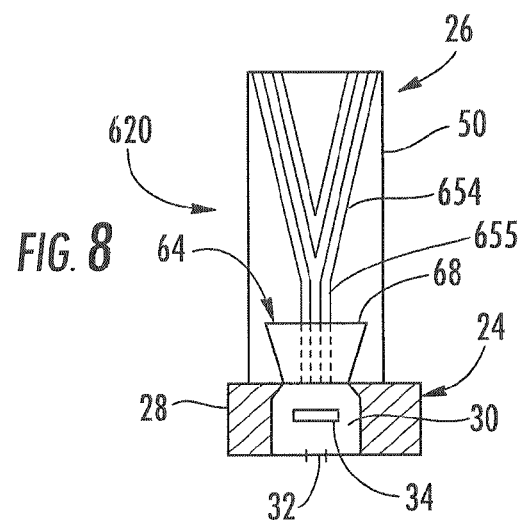
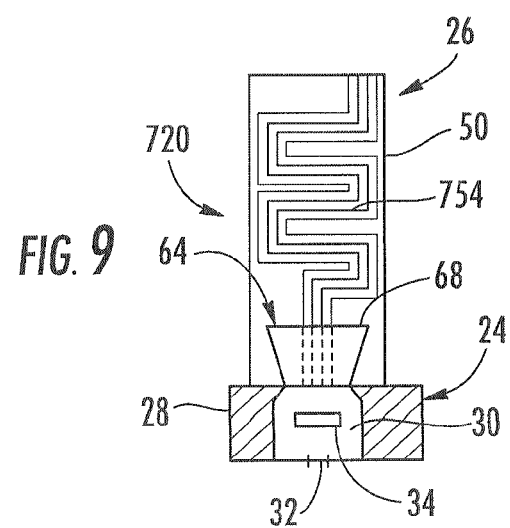

FLUID DISPENSING DEVICE

CROSS-REFERENCE TO RELATED PATENT APPLICATIONS

The present application is related to co-pending U.S. patent application Ser. No. 11/837,739 which was filed on Aug. 13, 2007 by Manish Giri, Joshua M. Ye and Kevin F. Peters and entitled FLUID TRANSFER DEVICE, the full disclosure of which is hereby incorporated by reference.

The present application is related to co-pending U.S. patent application Ser. No. 11/837,749 which was filed on Aug. 13, 2007 by Manish Giri, Joshua M. Yu, Kevin F. Peters and Paul J. Bruinsma and entitled FLUID DELIVERY SYSTEM, the full disclosure of which is hereby incorporated by reference.

BACKGROUND

Some applications, such as testing and research applications, utilize very small or minute measured volumes of fluid. Accurately and precisely dispensing and depositing such small volumes of fluid may be difficult. Existing fluid dispensing devices are complex, having external backpressure devices, do not dispense sufficient volumes of the fluid or may underutilize fluid placed in the device.

BRIEF DESCRIPTION OF THE DRAWINGS

FIG. 7 is a front elevational view, with portions shown in section, of another embodiment of the fluid dispensing device of FIG. 1 according to an example embodiment.

FIG. 8 is a front elevational view, with portions shown in section, of another embodiment of the fluid dispensing device of FIG. 1 according to an example embodiment.

FIG. 9 is a front elevational view, with portions shown in section, of another embodiment of the fluid dispensing device of FIG. 1 according to an example embodiment.

DETAILED DESCRIPTION OF THE EXAMPLE EMBODIMENTS

Figure 1:
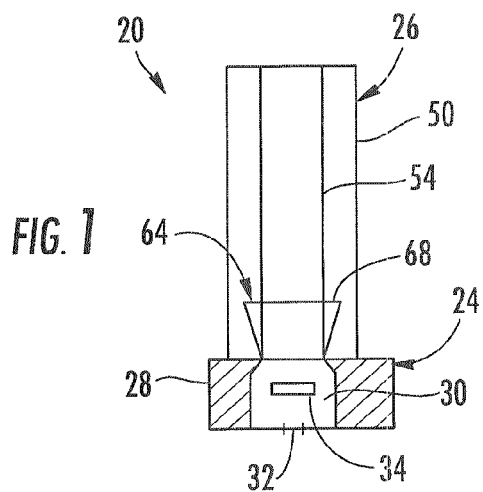
FIG. 1 is a front elevational view, with portions shown in section, schematically illustrating a fluid dispensing device according to an example embodiment.
Figure 2:
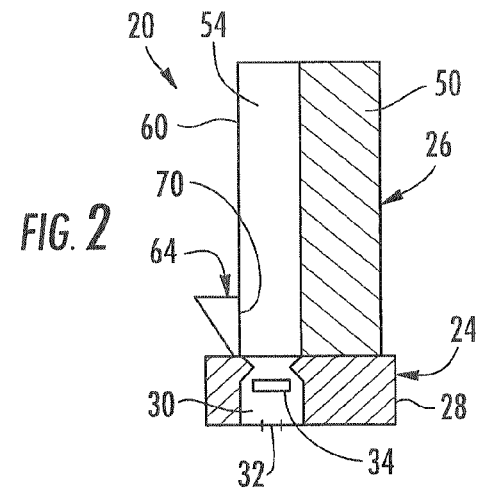
FIG. 2 is a side sectional view of the fluid dispensing device of FIG. 1 according to an example embodiment.

FIGS. 1 and 2 schematically illustrate an example embodiment of a fluid dispensing device 20. Fluid dispensing device 20 is configured to dispense and deposit or apply liquid or fluid. In one embodiment, fluid dispensing device 20 is configured to be manually held, manipulated and located during the deposition of the fluid. For example, in one embodiment, fluid dispensing device 20 is configured to be manipulated and held in a manner similar to that of a pen between a person's thumb and index finger. In other embodiments, fluid dispensing device 20 may be utilized as part of an automated liquid or fluid handling apparatus or delivery system. As will be described hereafter, fluid dispensing device 20 omits or reduces reliance upon an external back pressure device which otherwise might be used to retain fluid within device 20. As a result, fluid dispensing device 20 is more compact and less complex. In particular embodiments, fluid dispensing device 20 also carries larger volumes of fluid without substantially sacrificing reliability or fluid utilization.

Fluid dispensing device 20 comprises fluid ejecting device 24 and fluid reservoir or supply 26. Fluid ejecting device 24 (shown in section for purposes of illustration) comprises a device configured to eject or expel fluid. Fluid ejecting device 24 comprises body 28 forming firing or ejection chamber 30, nozzle 32 and fluid actuator 34. In one embodiment, body 28 is mounted directly to fluid supply 26. In one embodiment, body 28 may be formed from a material such as silicon. In other embodiments, body 28 may be integrally formed as a single unitary body with fluid supply 26 or may be formed from other materials.

Chamber 30 comprises an interior volume configured to receive fluid from fluid supply 26 through an inlet on the first side of body 28. Chamber 30 allows ejection or expulsion of fluid within chamber 30 through nozzle 32. Nozzle 32 comprises a port or opening on a second opposite side of body 28. In one embodiment, nozzle 32 may be provided by body 28. In another embodiment, nozzle 32 may be provided by one of more structures mounted or otherwise joined to body 28. Nozzle faces in a substantially vertical direction. In some embodiments, nozzle 32 may be slightly angled with respect to the vertical direction.

Fluid actuator 34 comprises a mechanism configured to forcefully expel fluid from chamber 30 through nozzle 32, largely in the direction indicated by arrow 42. In one embodiment, fluid actuator 34 comprises a drop-on-demand thermoresistive inkjet actuator, wherein a thin film resistor of actuator 34 heats to temperature so as to vaporize a portion of fluid within chamber 30 to create bubble that expels fluid through nozzle 32. In another embodiment, fluid actuator 34 comprises a drop-on-demand piezo resistive actuator or inkjet dispenser, wherein a piezo-electric film undergoes a change in shape or expands so as to change a volume of chamber 30 and to expel fluid through nozzle 32. In yet other embodiments, fluid actuator 34 may comprise other devices or mechanisms configured to selectively force or expel fluid within chamber 30 through nozzle 32.

According to one embodiment, body 28, chamber 30, nozzle 32 and fluid actuator 34 are formed as a print head die. Although fluid ejection device 24 is illustrated as including a single chamber 30, a single nozzle 32 and a single fluid actuator 34 being supplied with fluid from fluid supply 26, in other embodiments, fluid ejection device 24 may include multiple chambers 30, multiple nozzle 32 and multiple fluid ejection devices 34 supplied with fluid from the single fluid supply 26. In still other embodiments, fluid ejection device 34 may include multiple chambers 30, multiple nozzles 32 and multiple fluid ejection devices 34 supplied with fluid from more than one fluid supply 26.

Fluid supply 26 supplies fluid to chamber 30 so as to replace fluid that has been expelled through nozzle 32. Fluid supply 26 comprises a structure 50 having elongate slot 54 and fluid receiving cup 64. Slot 54 extends in a direction substantially parallel to the direction in which fluid is ejected through nozzle 32 (as indicated by arrow 42). In particular embodiments illustrated, the largest dimension of slot 54 is in a direction substantially parallel to the direction which fluid is ejected through nozzle 32, perpendicular to face 40. Although slot 54 is illustrated as directly overlying chamber 30, nozzle 32 and fluid actuator 34, in other embodiments, slot 54 may be horizontally offset with respect to chamber 30, nozzle 32 and fluid actuator 34.

Slot 54 is configured to wick fluid. In particular, slot 54 is configured or dimensioned such that fluid substantially spontaneously moves into slot 54 (through nozzle 32 during immersion of nozzle 32 in a fluid well (not shown) or through a side opening of slot 54) and (as seen in FIGS. 1 and 2) along slot 54 via capillary action, i.e. due to adhesive and cohesive intermolecular forces and surface tension. This capillary action further assists in holding or retaining the fluid within slot 54 until being drawn into chamber 30 after the expulsion of fluid through nozzle 32. As a result, slot 54 may be filled with fluid and fluid may be retained within slot 54 without any external back-pressure or any external back-pressure device, reducing the complexity, size and cost of fluid dispensing device 20.

In one embodiment, slot 254 has a volume greater than or equal to the volume of cup 64 so as to accommodate all the fluid in a full cup 64. According to one embodiment, slot 54 is configured to wick fluid a distance of at least 1 cm. According to one embodiment, slot 254 is configure to wick up fluid a majority (greater than 50%) of slot 54. In one embodiment, Slot 54 has a width D of between about 0.5 mm and about 6 mm (nominally 2.5 mm) and a depth D of between about 1 mm and 10 mm (nominally 5 mm). Depending upon the fluid to be wicked, such dimensions may vary. According to one embodiment, slot 54 is configured to wick and retain or store a volume of fluid of at least about 0.5 drops (2.5 microliters) and more frequently at least about 1 drop (75 microliters). To wick and retain such a volume of fluid, slot 54 has a height H based upon the width W and depth D (the cross-section of slot 54). According to one embodiment, slot 54 has a height H of between about 1 mm and 20 mm and nominally about 13 mm. Because of its ability to wick and retain such volumes of liquid or fluid, slot 54 provides fluid dispensing device with greater versatility.

As shown in FIG. 2, essentially all of slot 54 has a side opening 60. Side opening 60 connects an interior of slot 54 to atmosphere. As a result, as fluid wicks along slot 54, preexisting air within slot 54 may escape to atmosphere through side opening 60. Consequently, there is a reduced likelihood of air bubbles being formed within slot 54 and more reliable wicking and flow of fluid within slot 54.

In the example illustrated, substantially all of slot 54 has a side opening 60 (an aperture or opening facing in a substantially horizontal direction, perpendicular to the direction which fluid is ejected through nozzle 32). In other words, substantially an entire height H of slot 54 is exposed to atmosphere. As a result, an effectiveness of slot 54 for reducing air bubbles, for wicking and for fluid flow is enhanced. In the example illustrated, the slot 54 is open at its top, further allowing expulsion of air during filling. In other embodiments, slot 54 may be closed at its top.

Fluid receiving cup 64 comprises a structure or member configured, shaped or dimensioned so as to facilitate reception of fluid from an external source and the filling of slot 54 with fluid. Fluid receiving cup 64 is in fluid communication with slot 54 proximate to one end of slot 54 and proximate to chamber 30. In one embodiment, fluid receiving cup 64 comprises a receptacle having an enlarged port or mouth 68 by which fluid receiving cup 64 may receive fluid, wherein the received fluid flows under the force of capillary action into chamber 30 and further wicks up slot 54 for later use. In the example illustrated, fluid receiving cup 64 projects outwardly away from structure 50 outwardly beyond fluid ejection device 24. As a result, filling of cup 64 is better facilitated. In such an embodiment, fluid receiving cup 64 has a side aperture 70 by which fluid flows into slot 54 and chamber 30.

Fluid receiving cup 64 facilitates filling up slot 54 from its lower end. As a result, fluid filling slot 54 rises within slot 54 pushing any air within slot 54 out side opening 60 and out an opening at the upper end of slot 54. Because slot 54 is filled from the end fluidically coupled to the dispensing device, as compared to being filled from its remote end, there is a reduced likelihood of the fluid forcing air down towards and into chamber 30 or towards a bottom of slot 54 where a flow occluding bubble might otherwise be formed. In addition, upper portions of slot 54 are not wetted during filling of slot 54, allowing fluid dispensing device 20 to more fully utilize fluid that is placed within fluid dispensing device 20. In the example illustrated, fluid receiving cup 64 extends adjacent and in fluid connection with slot 54, adjacent to body 28 of fluid ejection device 24. In other embodiments, fluid receiving cup 64 may be located at other locations along the slot 54 on a side of slot 54 between the top and bottom ends.

In the example illustrated, fluid receiving cup 64 projects from side opening 60. As a result, fluid directly flows into slot 54 and is wicked towards an interior of slot 54. In other embodiments, fluid receiving cup 64 may be formed on another side of structure 50. For example, fluid receiving cup may be formed on a side opposite to side opening 60, wherein fluid filling receiving cup 64 enters slot 54 from a backside of slot 54 opposite to the side of slot 54 having side opening 60.

Figure 3:
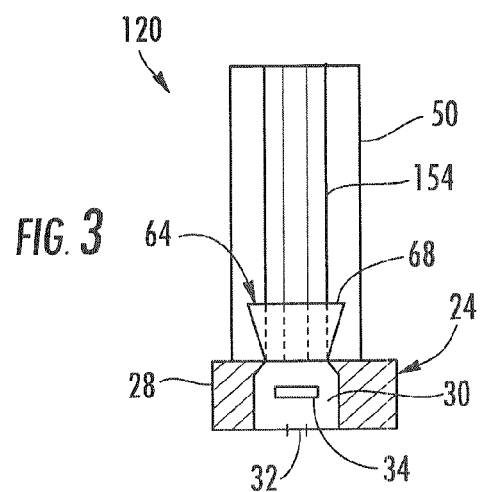
FIG. 3 is a front elevational view, with portions shown in section, of another embodiment of the fluid dispensing device of FIG. 1 according to an example embodiment.

FIG. 3 schematically illustrates fluid dispensing device 120, another embodiment of fluid dispensing device 20. Fluid dispensing device 120 is similar to fluid dispensing device 20 except that fluid dispensing device 120 includes slot 154 in place of slot 54. Those remaining elements of fluid dispensing device 120 which correspond to elements of fluid dispensing device 20 are numbered similarly.

Slot 154 is similar to slot 54 except that slot 154 is tapered from side opening 60 towards an interior of slot 154. In other words, the width of slot 154 is larger (W1) at side opening 60) and is smaller (W2) at an interior of slot 154. As a result, slot 154 wicks fluid away from side opening 60 towards the interior of slot 154. In addition, because side opening 60 may have a large surface area while slot 154 has a reduced cross-sectional area for capillary action, air may more easily escape or be pushed out of slot 54 during filling of slot 54. According to one embodiment, slot 154 tapers at an angle of between about 0 degrees and about 20 degrees. In other embodiments, slot 154 may taper at other angles.

Figure 4:
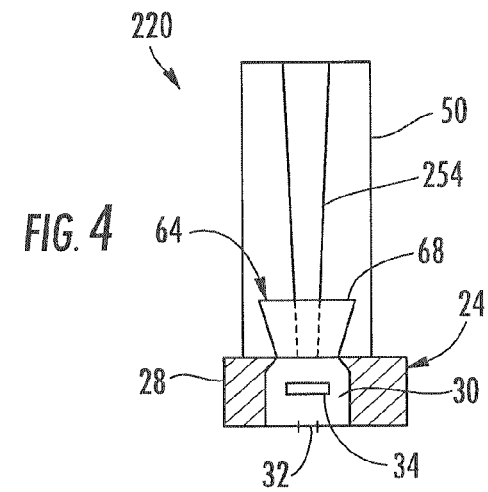
FIG. 4 is a front elevational view, with portions shown in section, of another embodiment of the fluid dispensing device of FIG. 1 according to an example embodiment.

FIG. 4 schematically illustrates fluid dispensing device 220, another embodiment of fluid dispensing device 20. Fluid dispensing device 220 is similar to fluid dispensing device 20 except that fluid dispensing device 220 includes slot 254 in place of slot 54. Those remaining elements of fluid dispensing device 220 which correspond to elements of fluid dispensing device 20 are numbered similarly.

Slot 254 is similar to slot 54 except that slot 254 is tapered towards nozzle 42. In other words, the width of slot 254 is wider at its top and is narrower at its bottom. As a result, air more easily escapes to atmosphere from slot 254 proximate the top of slot 254. According to one embodiment, slot 254 downwardly tapers at an angle of between about 0 degrees and about 20 degrees. In other embodiments, slot 254 may downwardly taper at other angles.

Figure 5:
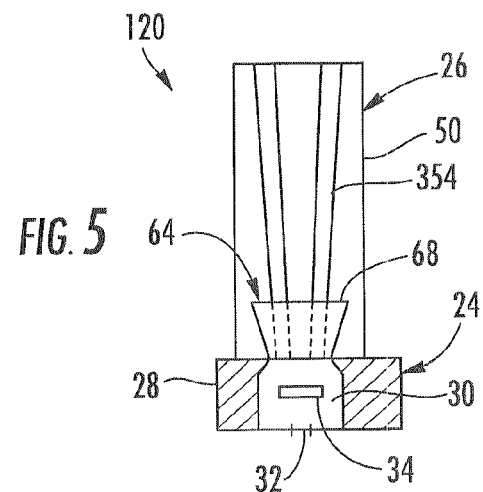
FIG. 5 is a front elevational view, with portions shown in section, of another embodiment of the fluid dispensing device of FIG. 1 according to an example embodiment.

FIG. 5 schematically illustrates fluid dispensing device 320, another embodiment of fluid dispensing device 20. Fluid dispensing device 320 is similar to fluid dispensing device 20 except that fluid dispensing device 320 includes slot 354 in place of slot 54. Those remaining elements of fluid dispensing device 320 which correspond to elements of fluid dispensing device 20 are numbered similarly.

Slot 354 is similar to slot 54 except that slot 354 is tapered from side opening 60 towards an interior of slot 154 and is also tapered towards nozzle 32. As with slot 154 described above, the width of slot 354 is larger (W1) at side opening 60) and is smaller (W2) at an interior of slot 354. As a result, slot 354 wicks fluid away from side opening 60 towards the interior of slot 354. In addition, because side opening 60 may have a large surface area while slot 354 has a reduced cross-sectional area for capillary action, air may more easily escape or be pushed out of slot 354 during filling of slot 354. According to one embodiment, slot 354 tapers at an angle of between about 5 degrees and about 20 degrees.

As with slot 254, slot 354 is tapered towards nozzle 32. In other words, the width of slot 354 is wider at its top and is narrower at its bottom. As a result, air more easily escapes to atmosphere from slot 354 proximate the top of slot 354. The vertical tapering of slot 354 may further assist in controlling an extent to which fluid wicks up slot 354 to control the amount of fluid contained by slot 354.

Figure 6:
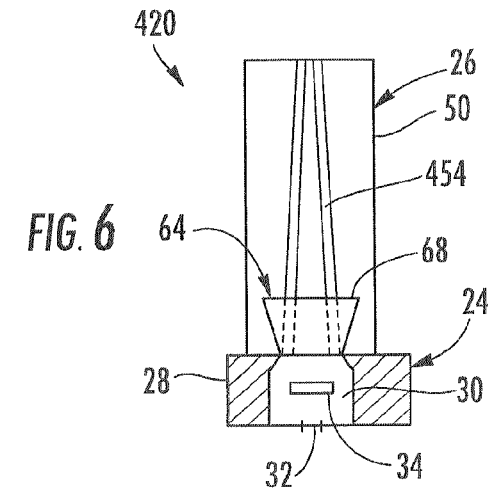
FIG. 6 is a front elevational view, with portions shown in section, of another embodiment of the fluid dispensing device of FIG. 1 according to an example embodiment.

FIG. 6 schematically illustrates fluid dispensing device 420, another embodiment of fluid dispensing device 20. Fluid dispensing device 420 is similar to fluid dispensing device 20 except that fluid dispensing device 420 includes slot 454 in place of slot 54. Those remaining elements of fluid dispensing device 420 which correspond to elements of fluid dispensing device 20 are numbered similarly.

Slot 454 is similar to slot 54 except that slot 354 is tapered from side opening 60 towards an interior of slot 454 and is also tapered vertically away from nozzle 32. As with slot 154 described above, the width of slot 454 is larger (W1) at side opening 60) and is smaller (W2) at an interior of slot 454. As a result, slot 454 wicks fluid away from side opening 60 towards the interior of slot 454. In addition, because side opening 60 may have a large surface area while slot 454 has a reduced cross-sectional area for capillary action, air may more easily escape or be pushed out of slot 454 during filling of slot 454. According to one embodiment, slot 454 tapers at an angle of between about 5 degrees and about 20 degrees.

As further shown by FIG. 6, slot 454 is tapered away from nozzle 32. In other words, the width of slot 354 is wider at its bottom and is narrower at its top. As a result, this reverse taper facilitates the existence of a more uniform back as fluid is drawn from slot 454. In particular, as slot 454 is filled to a greater extent and the width of slot 454 in contact with the meniscus of fluid within slot 454 narrows, capillary action is strengthened so as to retain the greater mass of fluid within slot 454. As slot 454 empties and the width of slot 454 in contact with the meniscus of fluid within slot 454 widens, capillary action is lessened, but the mass of fluid within slot role 454 is also lessened. According to one embodiment, slot 354 upwardly tapers at an angle of between about 0 degrees and about 20 degrees. In other embodiments, slot 354 may downwardly taper at other angles.

FIG. 7 schematically illustrates fluid dispensing device 520, another embodiment of fluid dispensing device 20. Fluid dispensing device 520 is similar to fluid dispensing device 120 except that fluid dispensing device 520 includes a plurality of slots 554 in place of a single slot 154. Those remaining elements of fluid dispensing device 520 which correspond to elements of fluid dispensing device 20 are numbered similarly.

Each of slots 554 is identical to slot 154 except that slots 554 do not extend to a top end of structure 50. Instead, slots 554 terminate and are closed off at their upper ends. Because fluid dispensing device 520 includes a plurality of slots 554, the fluid or liquid retaining or storage capacity of fluid dispensing device 520 is increased without increasing the height of fluid dispensing device 520. In addition, slots 554 may be better dimensioned so as to provide stronger capillary forces for more reliably drawing and retaining liquid in slot 554 through capillary action. Although each of slots 554 is illustrated as terminating prior to a top end of structure 50, in other embodiments, slots 554 may extend completely to the top of structure 50 in a fashion similar to slot 154. Although fluid dispensing device 520 is illustrated as including a pair of slots 554, in other embodiments, fluid dispensing device 520 may include three or more of such slots 554. Although slots 554 are illustrated as extending parallel to one another, in other embodiments, slots 554 may extend oblique with respect to one another. Although each of slots 554 is illustrated as being substantially identical to slot 154 described above with respect to FIG. 3, in other embodiments, each of slots 554 may alternatively have a configuration similar to slot 54 (shown and described with respect to FIG. 1), slot 254 (shown and described with respect to FIG. 4), slot 354 (shown and described with respect to FIG. 5) or slot 454 (shown and described with respect to FIG. 6).

FIG. 8 schematically illustrates fluid dispensing device 620, another embodiment of fluid dispensing device 20. Fluid dispensing device 620 is similar to fluid dispensing device 120 except that fluid dispensing device 620 includes a plurality of slots 654 connected directly to one another within structure 50 and connected to top 64 or chamber 30 by a single connecting slot 655. Those remaining elements of fluid dispensing device 620 which correspond to elements of fluid dispensing device 20 are numbered similarly.

Each of slots 654 and 655 is identical to slot 154. Because fluid dispensing device 620 includes a plurality of slots 654, the fluid or liquid retaining or storage capacity of fluid dispensing device 620 is increased without increasing the height of fluid dispensing device 620. In addition, slots 654, 655 may be better dimensioned so as to provide stronger capillary forces for more reliably drawing and retaining liquid in slots 654, 655 through capillary action. Because slot 655 connects both of slots 654 to cup 64 and chamber 30, cup 64 and chamber 30 may be narrower in that they do not have to accommodate the width of multiple slots.

Although each of slots 554 is illustrated as extending completely to the top of structure 50 in a fashion similar to slot 154, in other embodiments, slots 654 may terminate prior to a top end of structure 50 in a fashion similar to slots 554 shown in FIG. 7. Although fluid dispensing device 520 is illustrated as including a pair of slots 554 connected to slot 655, in other embodiments, fluid dispensing device 520 may include three or more of such slots 654 connected to slot 655. Although slots 554 are illustrated as extending oblique to one another, in other embodiments, slots 554 may extend parallel to one another prior to being connected to slot 655. Although each of slot 654, 655 is illustrated as being substantially identical to slot 154 described above with respect to FIG. 3, in other embodiments, each of slots 654, 655 may alternatively have a configuration similar to slot 54 (shown and described with respect to FIG. 1), slot 254 (shown and described with respect to FIG. 4), slot 354 (shown and described with respect to FIG. 5) or slot 454 (shown and described with respect to FIG. 6).

FIG. 9 schematically illustrates fluid dispensing device 720, another embodiment of fluid dispensing device 20. Fluid dispensing device 720 is similar to fluid dispensing device 120 except that fluid dispensing device 120 includes slot 754. Those remaining elements of fluid dispensing device 720 which correspond to elements of fluid dispensing device 20 are numbered similarly.

Slot 754 is substantially identical to slot 154 except that slot 754 extends in a serpentine path within structure 50. Some bombings, slot 754 extends in a labyrinth pattern. Because slot 754 extends in a labyrinth pattern or a serpentine path, the fluid or liquid retaining or storage capacity of fluid dispensing device 620 is increased without increasing the height of fluid dispensing device 620. In addition, slot 754 may be better dimensioned so as to provide stronger capillary forces for more reliably drawing and retaining liquid in slot 754 through capillary action.

Although each of slot 754 is illustrated as extending completely to the top of structure 50 in a fashion similar to slot 154, in other embodiments, slot 754 may terminate prior to a top end of structure 50 in a fashion similar to slots 554 shown in FIG. 7. Although fluid dispensing device 720 is illustrated as including a single slot 754 extending in a serpentine, in other embodiments, fluid dispensing device 720 may include a plurality of slots 754 extending in a serpentine manner and connected to cup 64 and chamber 30. Although each of slot 754 is illustrated as being substantially identical to slot 154 described above with respect to FIG. 3, in other embodiments, slot 754 may alternatively have a configuration similar to slot 54 (shown and described with respect to FIG. 1), slot 254 (shown and described with respect to FIG. 4), slot 354 (shown and described with respect to FIG. 5) or slot 454 (shown and described with respect to FIG. 6).

Figure 10:
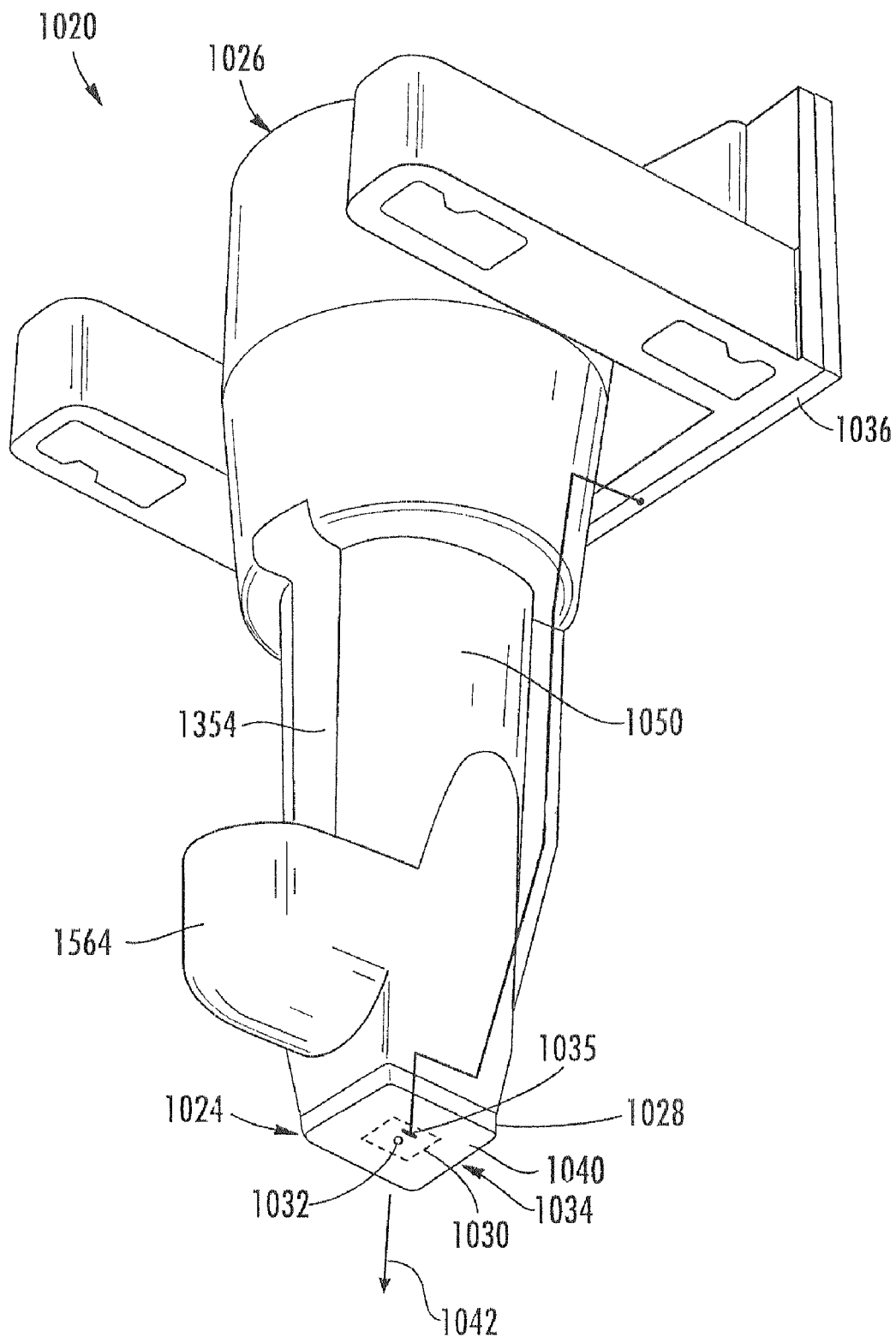
FIG. 10 is a bottom perspective view of another embodiment of the fluid dispensing device of FIG. 1 according to an example embodiment.
Figure 12:
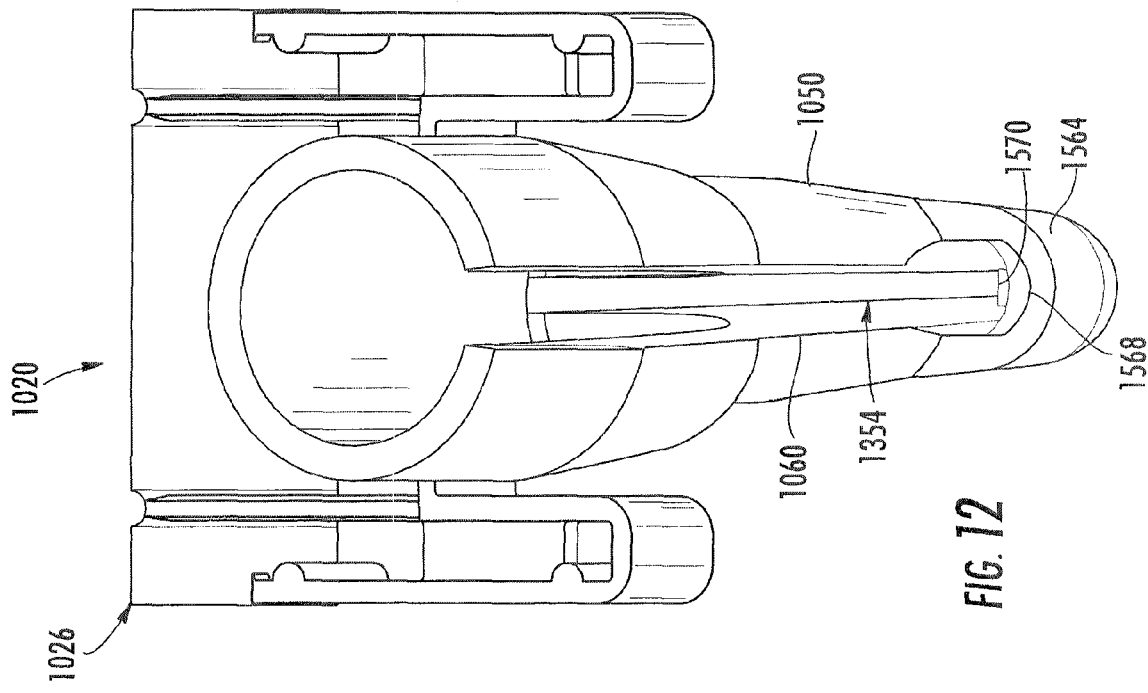
FIG. 12 is a front perspective view of the fluid dispensing device of FIG. 10 according to an example embodiment.
Figure 11:
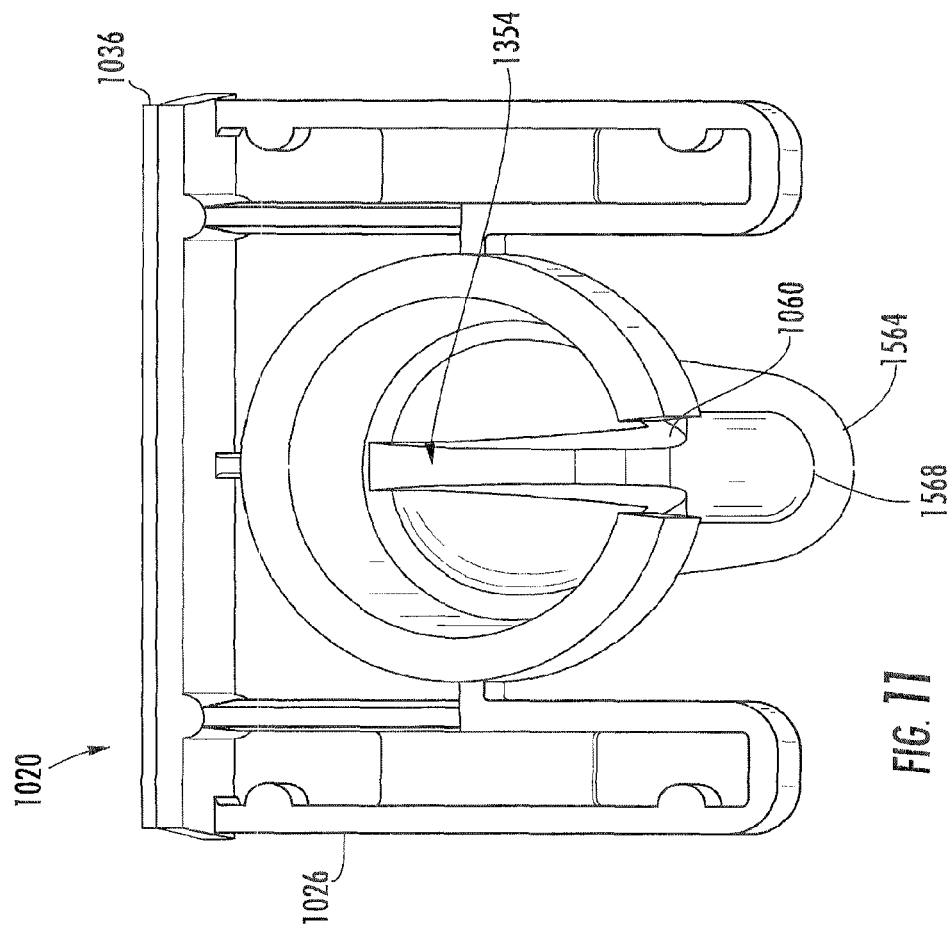
FIG. 11 is a top perspective view of the fluid dispensing device of FIG. 10 according to an example embodiment.

FIGS. 10-12 illustrate fluid dispensing device 1020, another embodiment of fluid dispensing device 20. Fluid dispensing device 1020 is configured to dispense and deposit or apply liquid or fluid. In one embodiment, fluid dispensing device 1020 is configured to be manually held, manipulated and located during the deposition of the fluid. For example, in one embodiment, fluid dispensing device 1020 is configured to be manipulated and held in a manner similar to that of a pen between a person's thumb and index finger. In other embodiments, fluid dispensing device 1020 may be utilized as part of an automated liquid or fluid handling apparatus or delivery system. As will be described hereafter, fluid dispensing device 1020 omits or reduces reliance upon any external back pressure device which otherwise might be used to retain fluid within device 1020. As a result, fluid dispensing device 1020 is more compact and less complex. In particular embodiments, fluid dispensing device 20 also carries larger volumes of fluid without substantially sacrificing reliability or fluid utilization.

Fluid dispensing device 1020 comprises fluid ejecting device 1024 (shown in FIG. 10) and fluid supply 1026. Fluid ejecting device 1024 comprises a device configured to eject or expel fluid. Fluid ejecting device 1024 comprises body 1028 forming firing or ejection chamber 1030 (schematically shown), nozzle 1032 and a fluid actuator (schematically shown in FIG. 1). In the embodiment illustrated, body 1028 is mounted directly to fluid supply 1026. In one embodiment, fluid supply 1028 may be formed from a material such as silicon. In other embodiments, body 1028 may be integrally formed as a single unitary body with fluid supply 1026 or may be formed from other materials.

Chamber 1030 comprises an interior volume configured to receive fluid from fluid supply 1026 through an inlet on the first side of body 1028. Chamber 1030 allows ejection or as expulsion of fluid within chamber 1030 through nozzle 1032. Nozzle 1032 comprises a port or opening on a second opposite side of body 28. In one embodiment, nozzle 1032 may be provided by body 1028. In another embodiment, nozzle 1032 may be provided by one of more structures mounted or otherwise joined to body 1028. Nozzle 1032 is located along a face 1040 and faces in a substantially vertical direction as indicated by arrow 1042. In some embodiments, nozzle 1032 may be slightly angled with respect to the direction indicated by arrow 1042.

Fluid actuator 1034 comprises mechanism configured to forcefully expel fluid from chamber 1030 through nozzle 1032, largely in the direction indicated by arrow 1042. In one embodiment, fluid actuator 1034 comprises a drop-on-demand thermoresistive inkjet actuator, wherein a thin film resistor 1035 of actuator 1034 is heated under the direction of a controller 1036 (shown as a circuit board electrically connected to resistor 1035 by one or more electrical connections such with a flexible circuit) to temperature so as to vaporize a portion of fluid within chamber 1030 to create bubble that expels fluid through nozzle 1032. In another embodiment, fluid actuator 1034 comprises a drop-on-demand piezo resistive actuator or inkjet dispenser, wherein a piezo-electric film 1035 under the direction of a controller 1036 (shown as a circuit board electrically connected to resistor 1035) undergoes a change in shape or expands so as to change a volume of chamber 1030 and to expel fluid through nozzle 1032. In yet other embodiments, fluid actuator 1034 may comprise other devices or mechanisms configured to selectively force or expel fluid within chamber 1030 through nozzle 1032.

According to one embodiment, body 1028, chamber 1030, nozzle 1032 and the film 1035 of fluid actuator 1034 are formed as a print head die. Although fluid ejection device 1024 is illustrated as including a single chamber 1030, a single nozzle 1032 and a single fluid actuator 1034 being supplied with fluid from fluid supply 1026, in other embodiments, fluid ejection device 1024 may include multiple chambers 1030, multiple nozzles 1032 and multiple fluid ejection devices 1034 supplied with fluid from the single fluid supply 1026. In still other embodiments, fluid ejection device 1034 may include multiple chambers 1030, multiple nozzles 1032 and multiple fluid ejection devices 1034 supplied with fluid from more than one fluid supply 1026.

Fluid supply 1026 supplies fluid to chamber 1030 so as to replace fluid that has been expelled through nozzle 1032. Fluid supply 1026 comprises a structure 1050 having an elongate vertical slot 1354 and fluid receiving cup 1564. Slot 1354 is similar to slot 354 (shown in FIG. 5) and extends in a direction substantially parallel to the direction in which fluid is ejected through nozzle 1032 (as indicated by arrow 1042). In particular embodiments illustrated, the largest dimension of slot 1354 is in a direction substantially parallel to the direction which fluid is ejected through nozzle 1032, perpendicular to face 1040.

Slot 1354 is configured to vertically wick fluid. In particular, slot 1354 is configured or dimensioned such that fluid substantially spontaneously moves into slot 1354 from fluid receiving cup 1564 and vertically upward (as seen in FIGS. 13 and 15) along slot 1354 via capillary action, i.e. due to adhesive and cohesive intermolecular forces and surface tension. This capillary action further assist in holding or retaining the fluid within slot 1354 until being drawn into chamber 1030 after the expulsion of fluid through nozzle 1032. As a result, slot 1354 may be filled with fluid and fluid may be retained within slot 1354 without any external back-pressure or any external back-pressure device, reducing the complexity, size and cost of fluid dispensing device 1020.

According to one embodiment, slot 1354 is configured to wick up fluid a distance or height of at least 13 mm. According to one embodiment, slot 1354 is configured to wick up fluid into a majority (greater than 50%) of slot 1354. In one embodiment, slot 1354 has a width of between about 0.5 mm and about 2.5 mm (nominally 1 mm) and a depth of between about 2 mm and 15 mm (nominally 6 mm). Depending upon the fluid to be wicked, such dimensions may slightly vary. According to one embodiment, slot 1354 is configured to wick and retain or store a volume of fluid of at least about 0.5 drops (2.5 microliters) and more frequently at least about 1 drop (75 microliters). To wick and retain such a volume of fluid, slot 1354 has a height H based upon the width and depth (the cross-section of slot 1354). According to one embodiment, slot 1354 has a height of at least about 1 mm and about 20 mm and nominally about 13 mm. Because of its ability to wick and retain such volumes of liquid or fluid, slot 1354 provides fluid dispensing de vice with greater versatility.

According to one embodiment, slot 1354 is configured to wick and retain a maximum volume of five drops (250 microliters) of fluid. As a result, less surface area of slot 1354 is wetted and less fluid remains in fluid dispensing device 1020 after its use. Thus, a greater percentage of fluid placed in fluid dispensing device 1020 is utilized, reducing waste of potentially expensive fluid. According to one embodiment, slot 1354 has a height of between about 1 mm and about 20 mm. In other embodiments, slot 1354 may have other heights and may be configured to wick and retain other volumes of fluid.

As shown in FIGS. 13-15, the full length of slot 1354 has a side opening 1060. Side opening 1060 connects an interior of slot 1354 to atmosphere. As a result, as fluid wicks along slot 1354, pre-existing air within slot 1354 may escape to atmosphere through side opening 1060. Consequently, there is a reduced likelihood of air bubbles being captured within slot 1354 and more reliable wicking and flow of fluid within slot 1354.

In the example illustrated, substantially all of slot 1354 has a side opening 1060. In other words, substantially an entire height H of slot 54 is exposed to atmosphere. As a result, an effectiveness of slot 1354 for reducing air bubbles, for wicking and for fluid flow is enhanced.

As further shown by FIGS. 11 and 12, slot 1354 is tapered from side opening 1060 towards an interior of slot 1354 and is also tapered towards nozzle 1032. The width of slot 1354 is larger at side opening 1060) and is smaller at an interior of slot 1354. As a result, slot 1354 wicks fluid away from side opening 1060 towards the interior of slot 1354. In addition, because side opening 1060 may have a large surface area while slot 1354 has a reduced cross-sectional area for capillary action, air may more easily escape or be pushed out of slot 1354 during filling of slot 1354. According to one embodiment, slot 1354 tapers at an angle of between about 5 degrees and about 20 degrees.

Slot 1254 is further tapered towards nozzle 1032. In other words, the width of slot 1354 is wider at its top and is narrower at its bottom. As a result, air more easily escapes to atmosphere from slot 1354 proximate the top of slot 1354. Slot 1354 downwardly tapers at an angle of between about 0 degrees and about 20 degrees. In other embodiments, slot 1354 may downwardly taper at other angles. In yet other embodiments, slot 1354 may omit downward tapering towards nozzle 1032. In still other embodiments, slot 1354 may alternatively include an upward taper similar to that shown FIG. 6 so as to provide uniform back pressure during the use of fluid dispensing device 1020.

Fluid receiving cup 1564 comprises a structure or member configured, shaped or dimensioned so as to facilitate reception of fluid from an external source and the filling of slot 1354 with fluid. Fluid receiving cup 1564 is in fluid communication with slot 1354 proximate a lower end of slot 1354 and proximate to chamber 1030. In one embodiment, fluid receiving cup 1564 comprises a cup having an enlarged port or mouth 1568 by which fluid receiving cup 1564 may receive fluid, wherein the received fluid flows under the force of gravity into chamber 1030 and further wicks up slot 1354 for later use. In the example illustrated, fluid receiving cup 1564 projects outwardly away from structure 1050 outwardly beyond fluid ejection device 1024. In such an embodiment, fluid receiving cup 1564 has a side aperture 1570 (shown in FIG. 12) by which fluid flows into slot 1354 and chamber 1030.

Fluid receiving cup 1564 facilitates filling up slot 1354 from its lower end. As a result, fluid filling slot 1354 rises within slot 1354 pushing any air within slot 1354 out side opening 1060 and out an opening at the upper end of slot 1354. Because slot 1354 is filled from its lower end, as compared to being filled from its upper end, there is a reduced likelihood of the fluid forcing air down towards and into chamber 1030 or towards a bottom of slot 1354 where a flow including bubble might otherwise be formed. In addition, upper portions of slot 1354 are not wetted during filling of slot 1354, allowing fluid dispensing device 1020 more fully utilize fluid that is placed within fluid dispensing device 1020. In the example illustrated, fluid receiving cup 1564 extends adjacent, in contact with or at a lower end of slot 1354. In other embodiments, fluid receiving cup 1564 may be located along the slot 1354 on a side of slot 1354 between the top and its bottom ends.

In the example illustrated, fluid receiving cup 1024 projects from side opening 1060. As a result, fluid directly flows into slot 1354 and is wicked towards an interior of slot 1354. In other embodiments, fluid receiving cup 1024 may be formed on another side of structure 1050. For example, fluid receiving cup may be formed on a side opposite to side opening 1060, wherein fluid filling slot 1354 enters slot 1354 from a backside of slot 1354 opposite to the side of slot 1354 having side opening 1060.

In operation, fluid is initially placed in fluid receiving cup 1564. The fluid flows into firing or ejection chamber 1030 through capillary forces. Due largely or solely to capillary action, fluid further wicks up slot 1354. This capillary action retains the fluid within slot 1354. As the fluid is ejected through nozzle 1032, the fluid flows under the force of gravity into chamber 1030 to replenish the ejected fluid.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible.

For example, unless specifically otherwise noted, the claims reciting a single particular element also encompass a plurality of such particular elements.

What is claimed is:

1. A fluid dispensing device comprising:
   a fluid ejecting device having a nozzle;
   a structure having a first slot having a side opening and in fluidic communication with the nozzle, the slot being configured to wick fluid to the ejecting device; and
   a fluid receiving cup in fluidic communication with the first slot proximate an ejecting device end of the first slot.

2. The fluid dispensing device of claim 1, wherein the first slot tapers from the side opening towards an interior of the first slot.

3. The fluid dispensing device of claim 2, wherein the first slot tapers at an angle of between about zero degrees and about 20 degrees.

4. The fluid dispensing device of claim 2, wherein the first slot tapers towards the fluid ejecting device.

5. The fluid dispensing device of claim 1, wherein the first slot tapers towards the fluid ejecting device.

6. The fluid dispensing device of claim 1, wherein the first slot tapers away from the fluid ejecting device.

7. The fluid dispensing device of claim 1, wherein the first slot extends in a serpentine path.

8. The fluid dispensing device of claim 1 further comprising a second slot having a side opening and in fluidic communication with the nozzle, the second slot being configured to wick fluid to the ejecting device.

9. The fluid dispensing device of claim 8, wherein the first slot and the second slot are each directly connected to the fluid receiving cup.

10. The fluid dispensing device of claim 8 further comprising a connecting slot connecting the first slot and the second slot to the fluid receiving cup.

11. The fluid dispensing device of claim 1 further comprising one or more slots, including the first slot, extending along a plurality of different axes and connected to the fluid ejecting device and the fluid receiving cup.

12. The fluid dispensing device of claim 1, wherein the first slot as a volume of less than or equal to about 2 cc.

13. The fluid dispensing device of claim 1, wherein the structure is configured to be manually held and manipulated as fluid is ejected through the fluid ejecting device.

14. The fluid dispensing device of claim 1 further comprising a print head die mounted to the structure and providing the fluid ejecting device.

15. The fluid dispensing device of claim 1, wherein the fluid ejecting device includes a thermoresistive fluid actuator.

16. A fluid dispensing device comprising
   a structure having an opening through which fluid is to be supplied to a fluid ejecting device, the structure comprising:
   a capillary chamber having a side opening and fluidly connected to the opening;
   a fluid receiving cup in fluid communication with the capillary chamber and the opening.

17. The fluid dispensing device of claim 16, wherein the capillary chamber comprises a slot.

18. The fluid dispensing device of claim 17, wherein the slot tapers from the side opening towards an interior of the slot.

19. The fluid dispensing device of claim 16 further comprising a print head die mounted to the structure and providing the fluid ejecting device.

20. A method comprising:
   filling a fluid receiving cup with fluid;
   drawing the fluid from the receiving cup into a capillary chamber using capillary forces of the capillary chamber
   drawing the fluid from the capillary chamber into a capillary channel of a fluid ejecting device using capillary forces of the capillary channel.

* * * * *